United States Patent
Lutzka et al.

(10) Patent No.: US 8,777,315 B2
(45) Date of Patent: Jul. 15, 2014

(54) HIGH BACK SEAT LATCH WITH INTEGRATED HANDLE

(75) Inventors: Tavis Lutzka, Davisburg, MI (US); Stanley D. Pacolt, Clarkston, MI (US); Paul Dennis Lesperance, Clinton Township, MI (US)

(73) Assignee: BAE Industries, Inc., Warren, MI (US)

( * ) Notice: Subject to any disclaimer, the term of this patent is extended or adjusted under 35 U.S.C. 154(b) by 350 days.

(21) Appl. No.: 13/359,618

(22) Filed: Jan. 27, 2012

(65) Prior Publication Data

US 2012/0193963 A1 Aug. 2, 2012

Related U.S. Application Data

(60) Provisional application No. 61/436,654, filed on Jan. 27, 2011.

(51) Int. Cl.
*B60N 2/20* (2006.01)
*B60N 2/36* (2006.01)

(52) U.S. Cl.
CPC .............. *B60N 2/366* (2013.01); *B60N 2205/40* (2013.01)
USPC .................................. 297/378.13; 296/65.17

(58) Field of Classification Search
USPC .......................... 297/378.13; 296/65.16, 65.17
See application file for complete search history.

(56) References Cited

U.S. PATENT DOCUMENTS

| 4,067,611 | A | 1/1978 | Kurozu et al. |
| 4,366,978 | A * | 1/1983 | Hamatani ....................... 296/68 |
| 4,428,611 | A | 1/1984 | Widmer |
| 4,633,724 | A * | 1/1987 | Mochida ..................... 74/471 R |
| 4,904,003 | A | 2/1990 | Yamazaki et al. |
| 5,662,369 | A * | 9/1997 | Tsuge .............................. 296/66 |
| 5,879,043 | A | 3/1999 | Radue et al. |
| 6,132,000 | A | 10/2000 | Tanaka |
| 6,312,055 | B1 | 11/2001 | Uematsu |
| 6,341,820 | B1 | 1/2002 | Kimura et al. |
| 6,705,679 | B1 * | 3/2004 | Zelmanov et al. ........ 297/378.13 |
| 6,786,551 | B2 | 9/2004 | Brewer et al. |
| 6,974,173 | B2 | 12/2005 | Yokoyama et al. |
| 7,032,973 | B2 | 4/2006 | Reubeuze |
| 7,137,667 | B2 | 11/2006 | Habedank |
| 7,338,128 | B2 | 3/2008 | Inoue et al. |
| 7,404,605 | B2 | 7/2008 | Inoue et al. |
| 7,490,908 | B2 | 2/2009 | Wieclawski |
| 7,517,022 | B2 | 4/2009 | Habedank et al. |
| 7,578,558 | B2 | 8/2009 | Tanaka |
| 8,393,682 | B2 * | 3/2013 | Hosoda et al. ........... 297/378.13 |
| 2008/0277976 | A1 | 11/2008 | Austin |
| 2009/0008981 | A1 | 1/2009 | Wieclawski |
| 2009/0033138 | A1 | 2/2009 | Yamada et al. |

* cited by examiner

*Primary Examiner* — David R Dunn
*Assistant Examiner* — Timothy J Brindley
(74) *Attorney, Agent, or Firm* — Gifford, Krass, Sprinkle, Anderson & Citkowski, P.C.; Douglas J. McEvoy

(57) ABSTRACT

The present invention teaches a high handle seat latch incorporated into a rotating seatback including a body integrated into the seatback and exhibiting a rear facing hook engaging a package shelf supported striker in an upright design position. A lift handle is supported at an upper end of the body and is accessible from a top of the seatback. A linkage interconnects the handle with the hook and is responsive to upward rotation of the handle to rotate the hook to a striker release and forward dump position. A cable actuates the linkage independent of the lift handle to actuate the hook to the release position.

20 Claims, 14 Drawing Sheets ically located rivet extending between the plates. A striker engaging portion of the hook projects into an interiorly recessed window portion established between the plates for facilitating clearance for seating the striker in the upright design position. An end location of the hook extends opposite the striker engaging portion, a coil spring being located along a rear edge of the package defined space and including a first end engaging the hook end location and a second end engaging a first structural cam and trigger inducing support located in alignment with a generally elongated and arcuate channel opening defined in the aligning support plates. A second anti chuck cam is provided in overlapping and slaved pivotal fashion relative to the first cam and so that the cams collectively abut a pivotal restraining edge configuration associated with the striker engaging hook.

HIGH BACK SEAT LATCH WITH INTEGRATED HANDLE

CROSS-REFERENCE TO RELATED APPLICATIONS

This Application claims the benefit of U.S. Provisional Application 61/436,654 filed on Jan. 27, 2011.

FIELD OF THE INVENTION

The present invention discloses a universal high handle seat latch incorporated into a rotating rear row seatback. More specifically, the seat latch includes a lift handle incorporated into a reveal or frame portion of the latch and which is mounted to an upper/side location of the seat for triggering release of a rotating hook from a vehicle supported striker. A separate linkage is communicated from such as a rear hatchback location to an offset pivot location relative to the actuating handle, such including a displacing cable which actuates the striker engaging hook independently from the latch handle.

DESCRIPTION OF THE PRIOR ART

The prior art is documented with examples of high back seat latches in which a handle and lever is incorporated into a seatback and which in turn engages an aligning striker or like retention structure associated with an interior frame or pillar support location of the vehicle. By example, U.S. Pat. No. 7,032,973 to Reubeuze teaches a system for locking a first element to a second element in which a user actuated control member is fitted on the first element in a rectilinear and perpendicular direction to a latch pivot pin designed to cooperate with an anchor member fixed on the second member. The control member includes a housing for receiving a finger of the latch in a locked position to prevent the latch from pivoting about the pivot pin.

Yamada, US Patent Application Publication 2009/0033138, teaches a lock apparatus associated with a side exposed location of a pivotal seatback and including a striker, base, hook and pawl restraining pivotal movement of the hook towards an unlock position while allowing pivotal movement towards a lock position. A cam member exhibits a profile for allowing the pivotal movement of the hook towards the lock position and for restraining pivotal movement towards the unlock position. Upon the hook pivoting to the lock position, the striker is positioned between the rotational shaft of the hook as well as that of the pawl. The pawl and hook are engaged at an opposite position of the rotational shaft of the hook relative to the striker. Additional examples of latch configurations associated with a pivoting seatback include each of Kimura, U.S. Pat. No. 6,341,820, Wieclawski, U.S. Pat. No. 7,490,908, Inoue, U.S. Pat. No. 7,404,605 and U.S. Pat. No. 7,338,128, Widmer, U.S. Pat. No. 4,428,611 and Yamazaki, U.S. Pat. No. 4,904,003.

SUMMARY OF THE PRESENT INVENTION

The present invention teaches a high handle seat latch incorporated into a rotating seatback including a body integrated into the seatback and exhibiting a rear facing hook engaging a package shelf supported striker in an upright design position. A lift handle is supported at an upper end of the body and is accessible from a top of the seatback. A linkage interconnects the handle with the hook and is responsive to upward rotation of the handle to rotate the hook to a striker release and forward dump position. A cable actuates the linkage independent of the lift handle to actuate the hook to the release position.

The body further includes a pair of spaced apart plates defining an interior package space within which is pivotally supported the hook pivotally slaved at a pivot point defined by centrally located rivet extending between the plates. A striker engaging portion of the hook projects into an interiorly recessed window portion established between the plates for facilitating clearance for seating the striker in the upright design position. An end location of the hook extends opposite the striker engaging portion, a coil spring being located along a rear edge of the package defined space and including a first end engaging the hook end location and a second end engaging a first structural cam and trigger inducing support located in alignment with a generally elongated and arcuate channel opening defined in the aligning support plates. A second anti chuck cam is provided in overlapping and slaved pivotal fashion relative to the first cam and so that the cams collectively abut a pivotal restraining edge configuration associated with the striker engaging hook.

A trigger displacing stem exhibits an elongated and stepped configuration, with a lower-most end engaging a location of the cam. An upper enlarged disc is supported atop an end of an opposite and uppermost portion of the stem. A generally hook shaped trigger is supported at an upper end of the body in coaxial fashion with the lift handle, a first end of the trigger seated upon the lift handle and slaved thereto in order to actuate the linkage, the cable engaging a second opposite end of the trigger.

Other features include a window interior defined by an upper reveal within which is pivotally supported the handle and trigger. The handle defines a generally "U" shape in configuration with an inner space seating an uppermost portion of the trigger along the coaxial pivot point.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
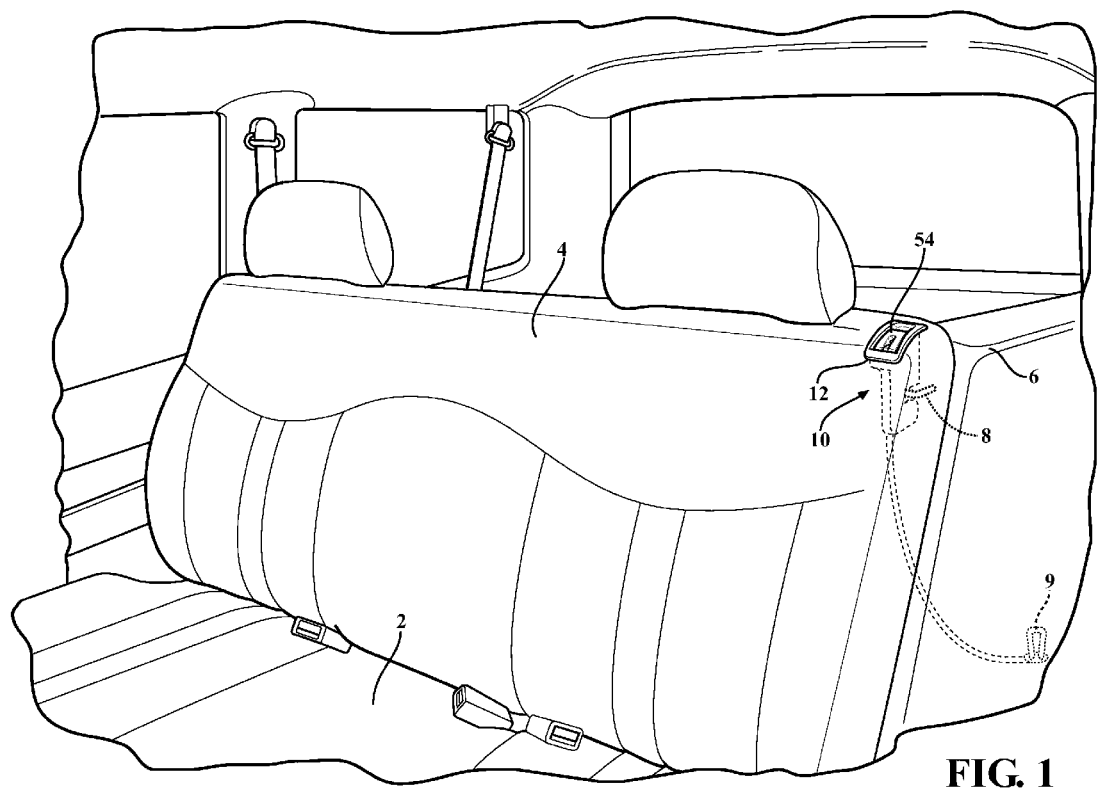
FIG. 1 is an environmental view of a vehicle rear passenger compartment interior including a pivotal seatback within which is incorporated the seat latch with integrated handle according to an embodiment of the present invention.

FIG. 1 illustrates an environmental view of a vehicle rear passenger compartment including a seat with a seat bottom 2 and a pivotally associated seat back 4. A high back seat latch, generally depicted at 10 and as more clearly illustrated in each of FIG. 2 et seq., is integrated into an elevated location of the seatback 4 interior such that an uppermost and outer frame (or surface reveal) 12 is accessible from a top side location of the seatback 4.

The seatback 4 includes a widthwise pivot support arranged at a bottom edge (the corresponding hinge mechanisms not being evident but which are incorporated into the interface between the seat back and bottom) and such that, upon triggering release of the latch 10 from a rear package shelf 6 with opposing and supported striker 8 the seatback is caused to pivot forwardly to a dump position, such as to communicate to a rear trunk enclosure associated with the vehicle. As further shown in phantom in FIG. 1, and as will be subsequently described in detail, a separate trigger 9 can be located at a remote location within the vehicle, such as at a trunk accessible location, and which can trigger seatback, using the existing linkages within the latch assembly, to release the seat back 4 separately from the lift handle (see subsequently described at 54) built into the accessible surface reveal location (see contoured frame 12 established within a flush mounted fashion at an elevated exposed location the seatback 4 such as proximate an upper edge location which is both most accessible to the operator as well as strategically located close to the supporting package shelf 6 location).

Figure 2:
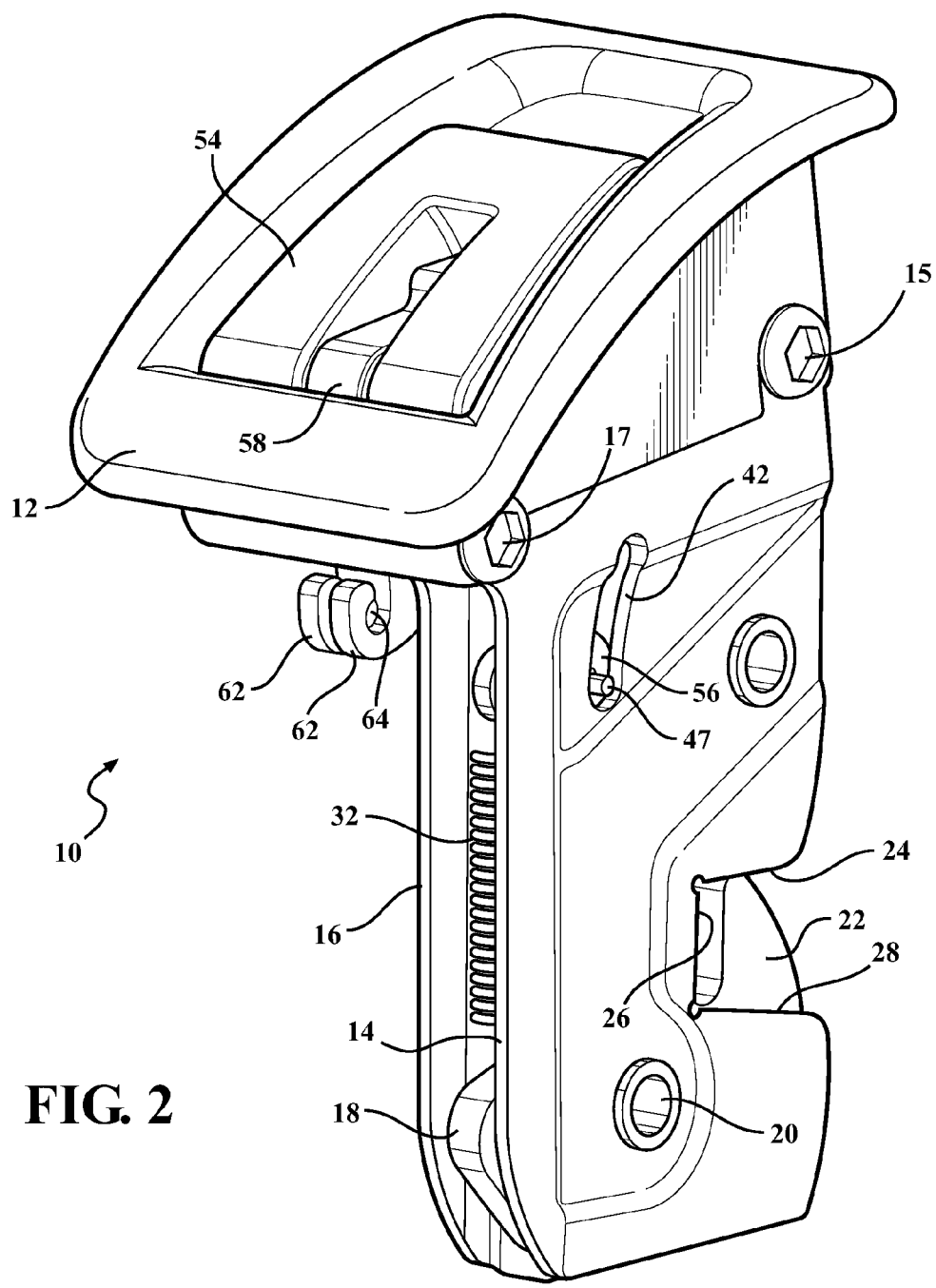
FIG. 2 is a perspective illustration of a seat latch with integrated handle, such as which is incorporated into the elevated seatback location depicted in FIG. 1.
Figure 3:
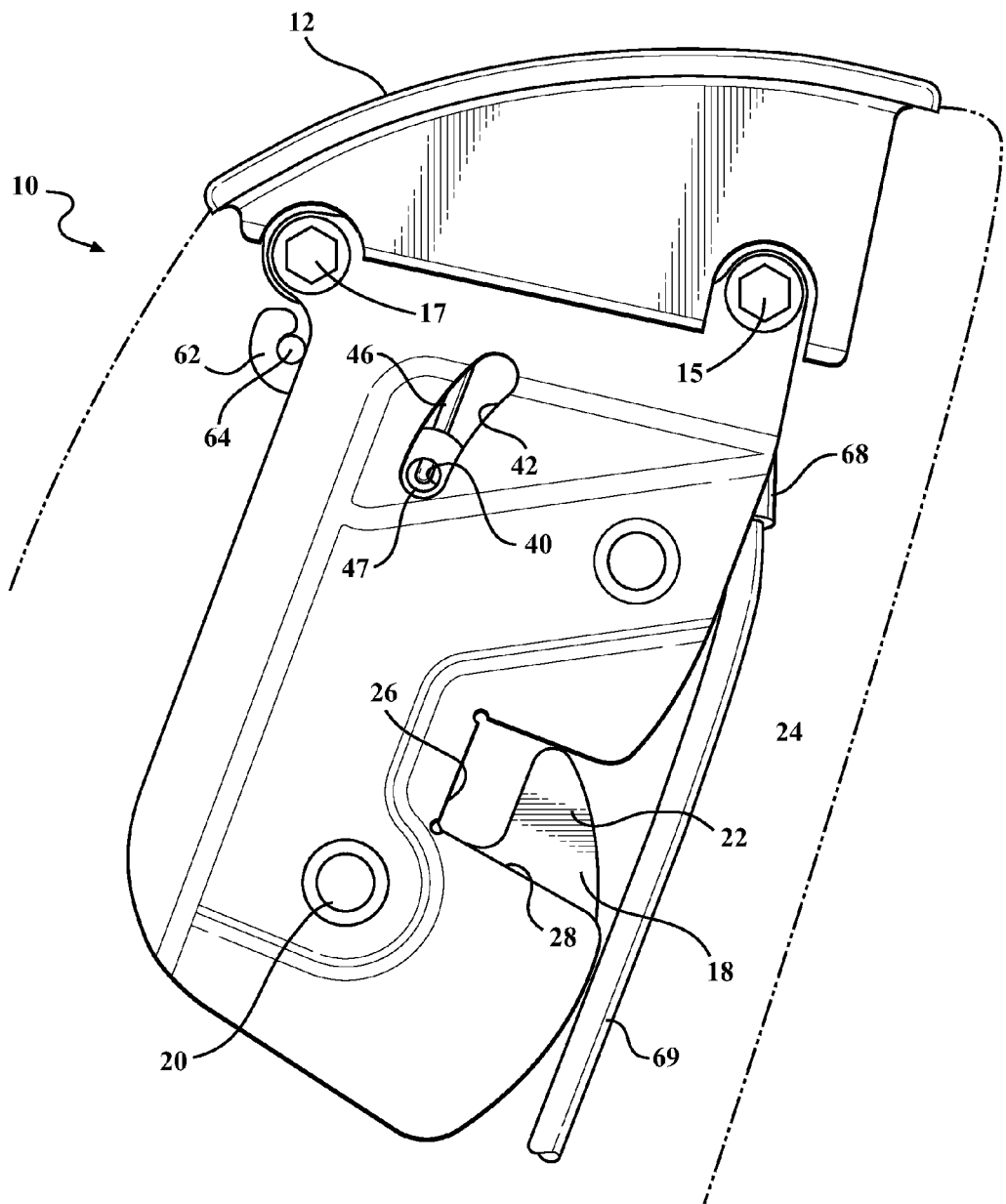
FIG. 3 is a rotated side view of the latch depicted in FIG. 2 and better illustrating the rotating hook in the engaged position.
Figure 12:
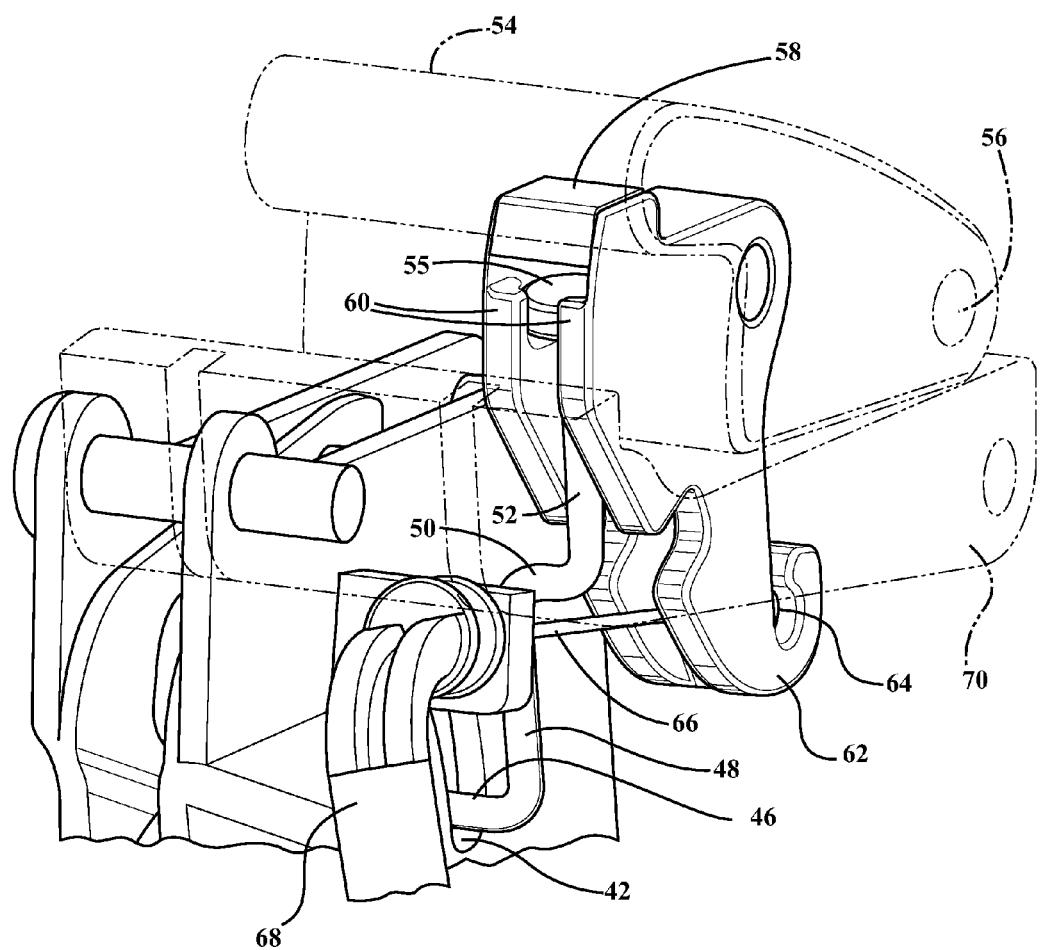
FIG. 12 is a further enlarged rotated perspective of the upper linkage mechanism associated, with the latch with the lift handle and base support shown in phantom, and better illustrating the inner pivoting component which is both slaved to the lift handle and independently actuated by inward displacement of the cable.
Figure 13:
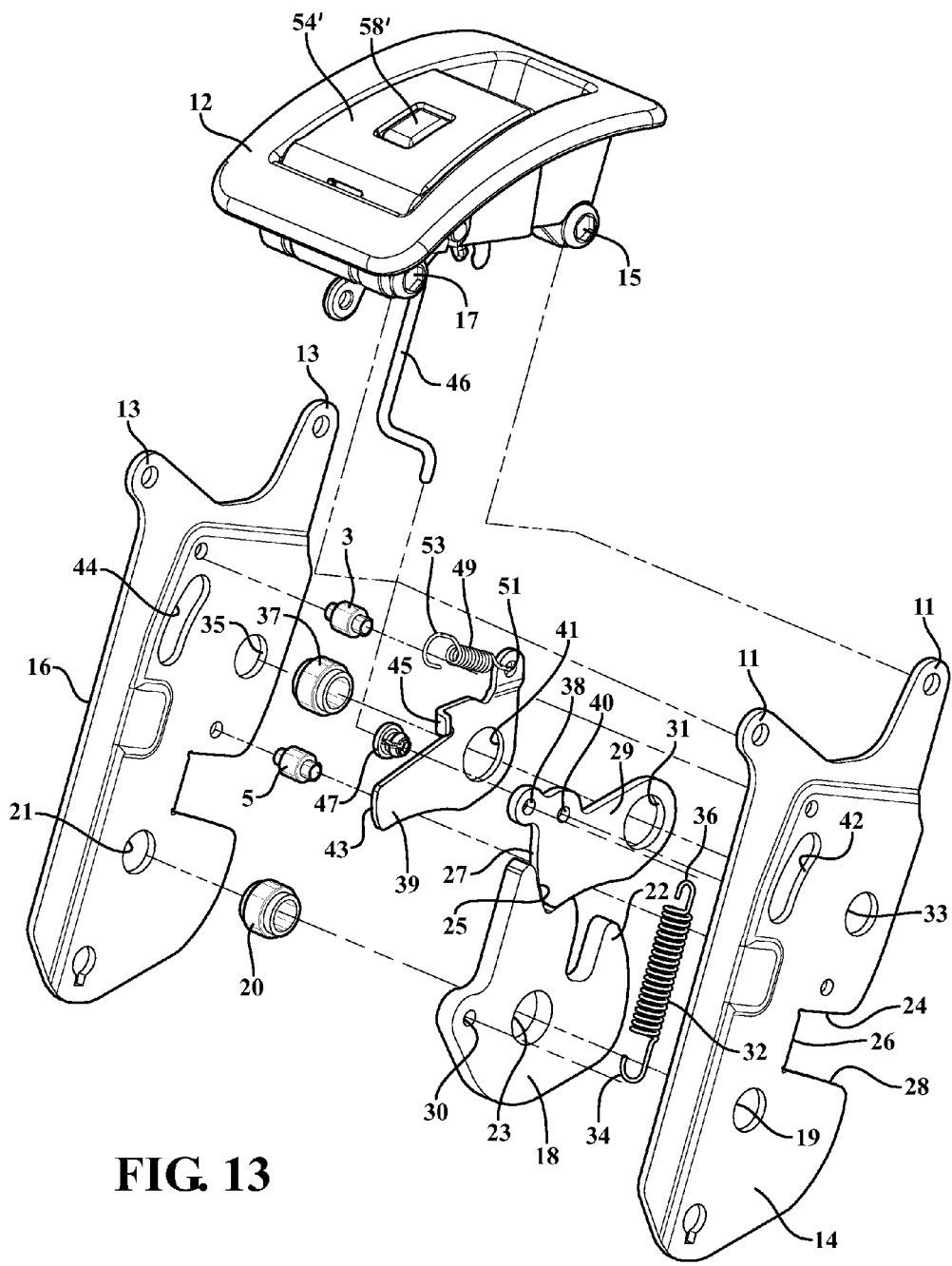
FIG. 13 is an exploded view of the latch.

Referring to FIG. 2 in combination with FIGS. 12-13, a main body of the latch assembly 10 further exhibits a pair of spaced apart plates 14 and 16. Pairs 11 and 13 of upper edge projecting ears form portions of the plates 14 and 16, each of which further includes an inner aperture which aligns with underside configured locations, see enclosed fasteners 15 and 17 of the upper attachable surface reveal 12, and in order to assembly the package defining assembly as shown in FIG. 2. Spacer rivets 3 and 5 are provided and mount between aligning aperture locations in the support plates 14 and 16 in order to establish the package receiving space for pivotally supporting the components of the assembly as will be described below.

An interior package space established between the support plates 14 and 16 contains a pivotally supported hook including a main body 18 which is pivotally slaved at a pivot point defined by centrally located rivet 20 extending between aligning apertures, see inner extending perimeters 19 and 21 defined in the plates 14 and 16 and seating through a further aperture 23 defined in the hook 18. A striker engaging portion 22 of the hook 18 projects into an interiorly recessed window portion defined by interconnecting recessed surfaces 24, 26 and 28 (shown in selected plate 14 but identically illustrated in spatially aligning plate 16) and which is established in mating fashion along common side edges of the aligning plates 14 and 16 in a direction facing towards the shelf 6 supported striker 8, and which is dimensioned for facilitating clearance for seating the striker 8 in the upright design position.

A further generally opposite end location of the hook 18, relative to the pivot rivet 20, further exhibits an aperture defined by an inner perimeter surface defining ring 30. A further edge configured location 25 (best shown in FIGS. 12-13) depicts a loose seating location, such as exhibiting a minimal gap or incremental spacing between the edge configured location 25 and an opposing edge configuration 27 associated with a first pivotally mounted and structurally supporting cam 29. The cam 29 further includes an inner pivot mounting aperture 31, this aligning with apertures 33 and 35 in the plates 14 and 16 for receiving a pivot pin 37.

Figure 4:
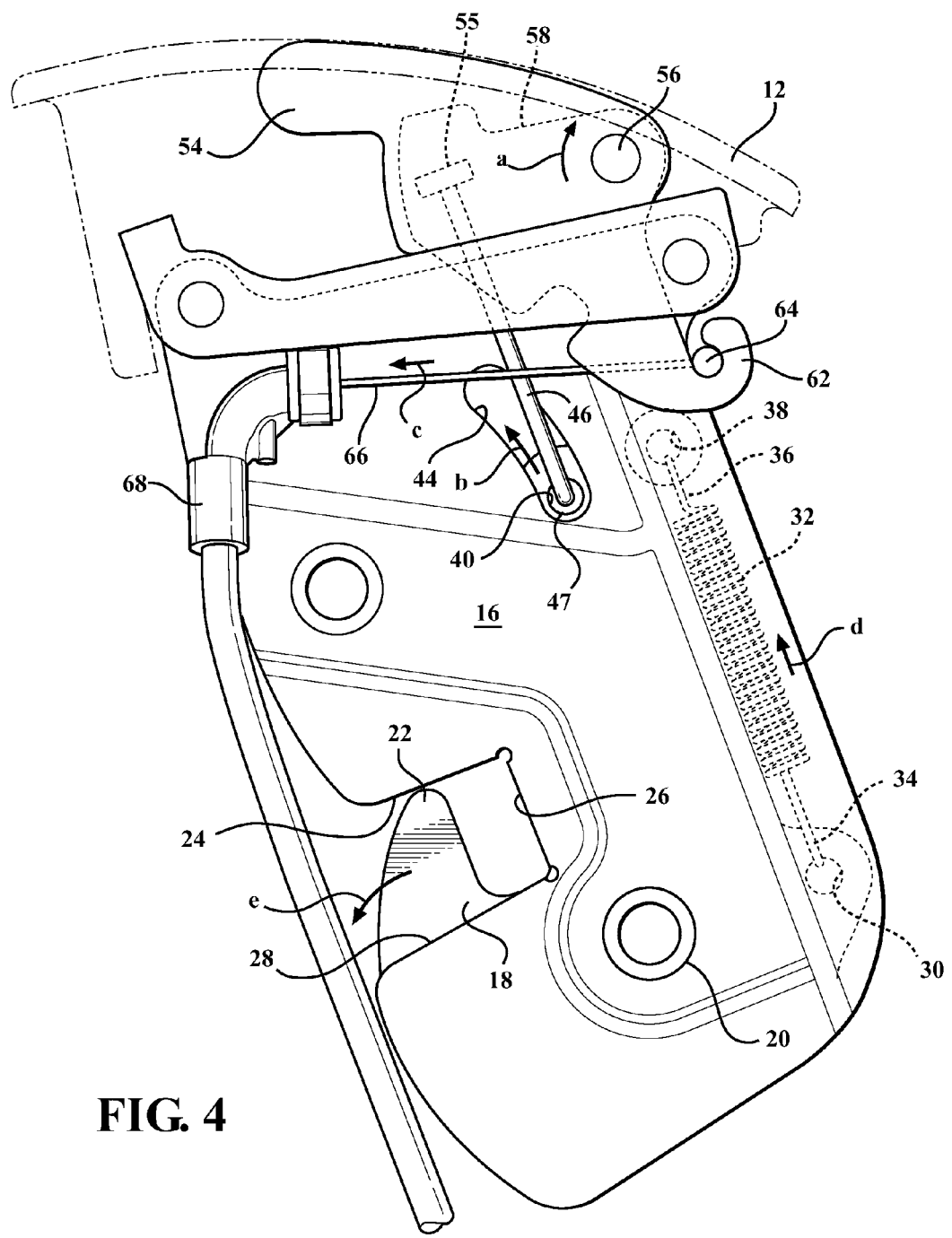
FIG. 4 is a 180° rotated side view of the latch in FIG. 3 and further illustrating the hook in a first engaged position along with showing, in partial phantom, the operable components associated with both the lift handle and cable actuating linkages for triggering subsequent release, via a sequence of depicted directional arrows a-e, of the striker engaging hook in an unlatching direction.
Figure 5:
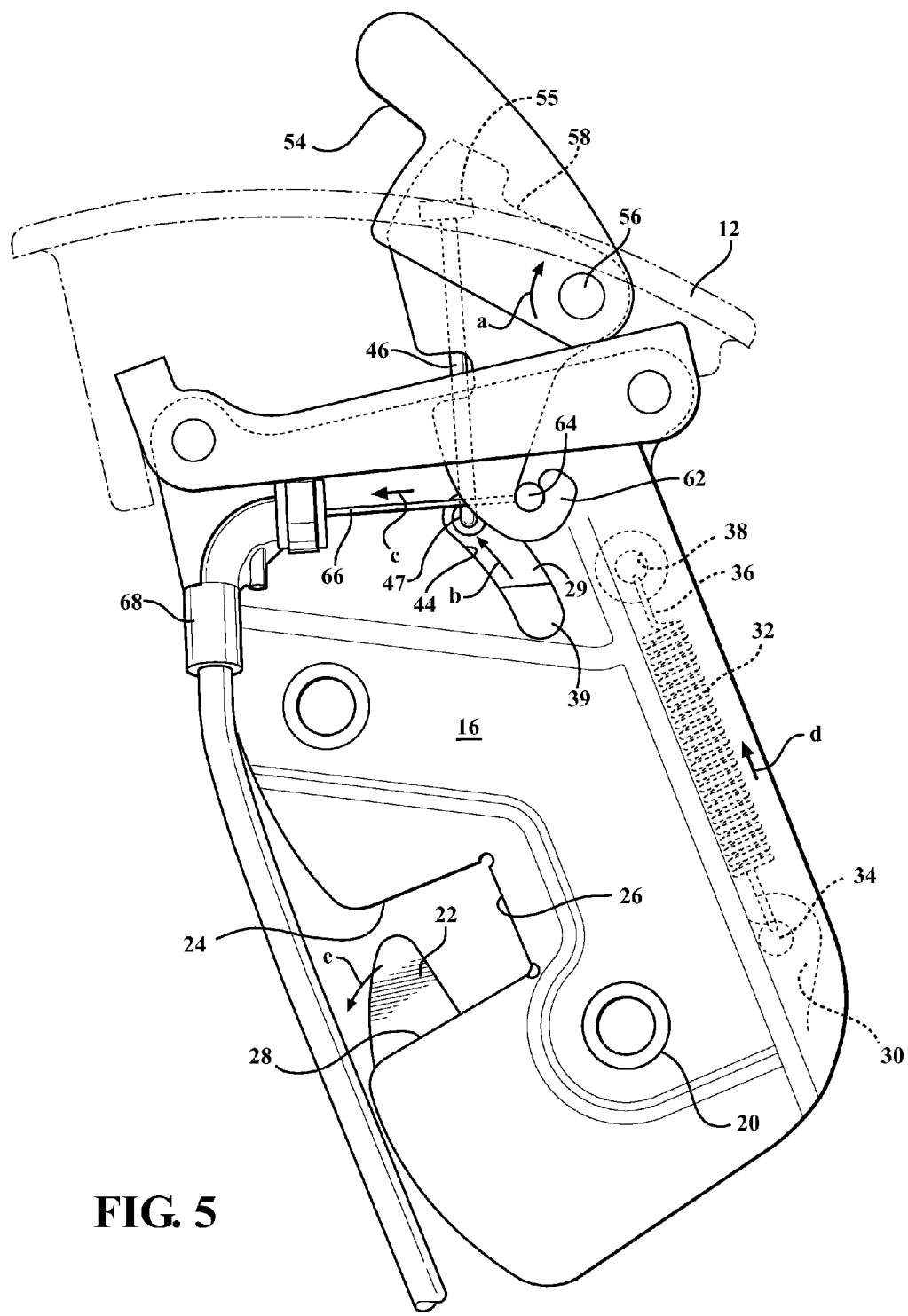
FIG. 5 is a succeeding illustration to FIG. 4 and which shows the lift handle in an upwardly rotated position, along with slaved rotation of the inner trigger component, and for initiating the unlatching protocol.

As best shown in FIG. 4 et seq., a coil spring 32 is located along a rear edge of the package defined space and includes a first curled end 34 engaging the ring aperture 30 (see as best shown in FIGS. 4 and 5), with a second curled or hooked end 36 of the spring 32 engaging a first key (inner perimeter defining rim surface) aperture 38 of the structurally supporting cam 29. The cam 29 includes a second spaced apart ring aperture 40 which is located in alignment with a pair of aligning and generally elongated and arcuate channel openings, at 42 and 44, defined in the aligning support plates 14 and 16 (and for receiving the guided mounting pin 47 further described below).

Figure 14:
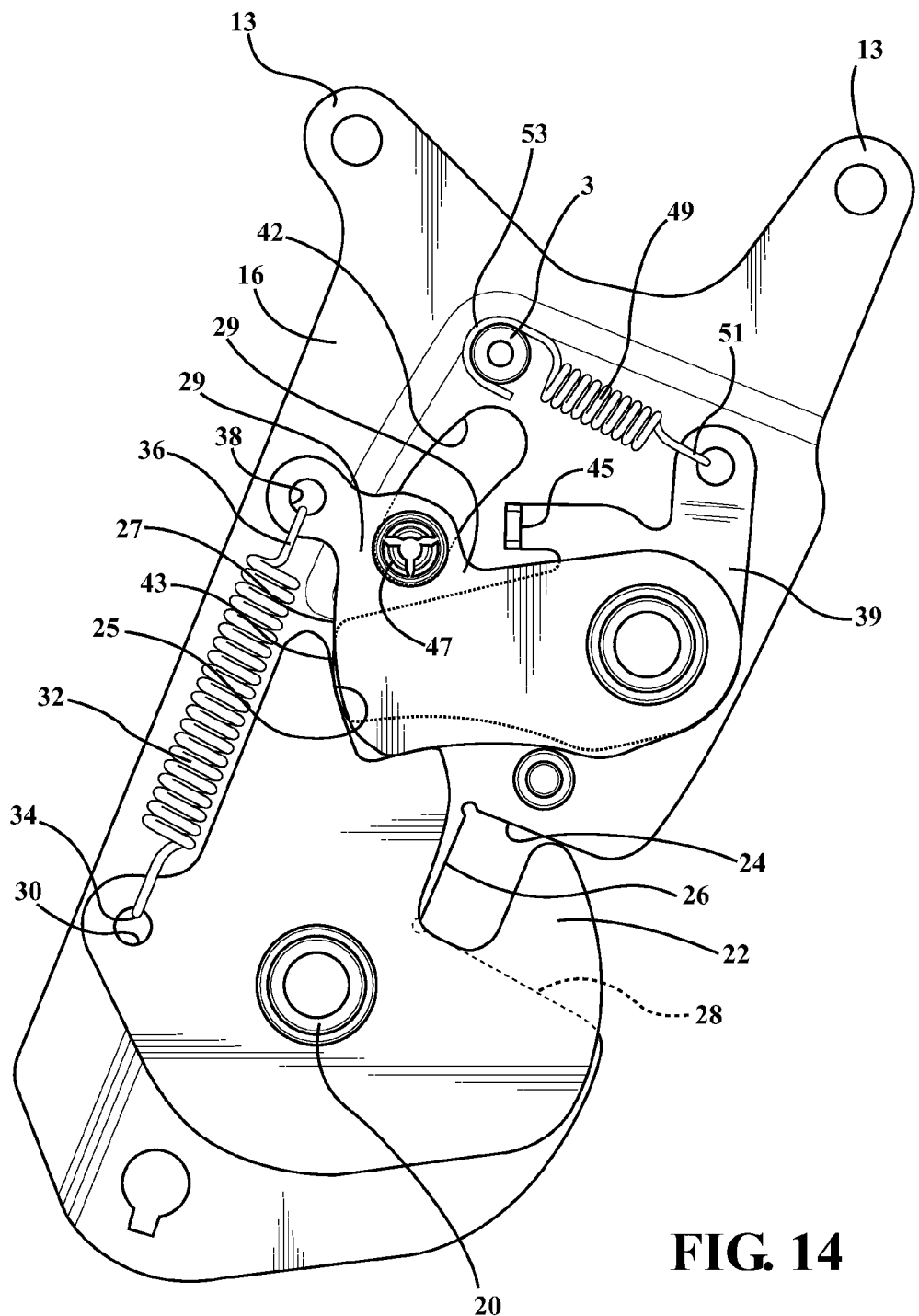
FIG. 14 is a side plan view with countered upper reveal frame and selected outer plate removed for better illustrating the pivotally mounted arrangement of the hook, cam and trigger support.

A secondary anti chuck cam 39 is also provided (see again as best shown in FIGS. 13-14) and includes an aligning aperture 41 for receiving the pivot pin 37 so as to mount the second anti-chuck cam 39 in overlapping and pivotally stacked fashion relative to the first structural supporting cam 29 and further such that a configured edge 43 of the anti-chuck cam 39 substantially aligns with the configured edge 27 of the first cam 29, with the edge 43 exhibiting a somewhat greater dimension such that it abuts the supported hook surface 25 in a snug manner. In this fashion, the anti-chuck cam 39 is provides initial load holding capability to the latch assembly without the existence of any looseness (such as rattle or play). In the event of the occurrence of a severe loading force (such as including but not limited to an inertially induced collision of the vehicle) the anti-chuck cam 39, by virtue of its material construction and dimensions, is designed to collapse or deform an incremental degree, thus bringing the minimally spaced edge 27 of the structural supporting cam 29 into contact with the hook supported surface location 25, thereby maintaining the design position of the hook while also retaining the operational capacity of the latch assembly. Additional variants can include only a single structurally supporting cam being employed, as opposed to the stacked arrangement of structural and anti chuck cams 29 and 39, and further such that its remote extending and hook supporting edge configuration (i.e. again at 27) can exhibit any desired tolerancing relative to the abutting edge surface 25 of the hook 18.

An inwardly turned tab 45 extends along an upper profile edge of the anti chuck cam 39 (see again as shown in FIG. 13) and such that upward pivoting of the structural cam 29 will cause the anti chuck cam 39 to likewise pivot in slaved fashion by virtue of the upper profile edge of the first structural cam 29 engaging the tab 45, with the second anti chuck cam 39 likewise pivoting the first cam 29 in slaved fashion by virtue it abutting pin 47 seating through the second aperture 40 of the first cam 29, the pin 47 further projecting in a widthwise fashion such that it seats through either or both of the arcuate apertures 42 and 44. In this fashion, upper pivoting of the second cam 39 contacts the cap 47 and causes the first cam 29 to concurrently upwardly pivot out of engagement with the hook abutment location 25.

A second coil spring 49 includes a first end 51 engaging a rear spaced location of the second (anti chuck) cam 39, a second spring end 53 engaging the spacer rivet 3 and which exerts a rotational bias to the second cam 39 which is consistent with that exerted by first coil spring 32 on the first (structural) cam 29.

A trigger displacing stem is illustrated and includes an elongated and stepped configuration, with a lower-most end depicted by portion 46 which engages the channel exposed ring aperture 40. The upper linkage depicted further exhibits succeeding and interconnected stepped portions 48, 50 and 52 (see FIG. 12) extending upward from the lower extending portion 46, with an upper enlarged disc 55 being supported atop an end of an opposite and uppermost portion 52. As will be more thoroughly explained below, upward displacement of the stem and slaved cams 29 and 39 results in tensioning of the spring 32 and rotating of the hook 18 by which the engaging portion 22 rotates out of location with the inwardly recessed window (surfaces 24, 26, 28) and in order to release from the package located striker 8.

A lift handle 54 is located within a window interior defined by the upper reveal 12 and is pivotally supported, at 56 (FIG. 4 et seq.), to inner aligning sides thereof of the perimeter defining and surface accessible reveal 12. The handle 56 defines a generally "U" shape in configuration with an inner space seating an uppermost portion of pseudo hook shaped and rotating trigger component 58 which is coaxially mounted along like pivot point 56. The related variant of FIGS. 12-13 further depicts the handle at 54' as exhibiting a four sided configuration (still pivotally associated along its bottom edge) and further in which the inner trigger component is reconfigured, at 58', to seat within an inner window defined in the handle 54'.

Although not clearly depicted, the inner facing surfaces of the lift handle, such as again at 54, are configured such that, upon being rotated upwardly, the supported portion of the corresponding trigger component 58 is slaved to rotate in unison. As will be further described, the component 58 is further capable of being independently upwardly rotated without requiring actuation of the lift handle.

The construction of the trigger component 58 is further such that spaced apart portions extend from an integral portion located proximate the pivot 56, this being best shown in the substantially enlarged phantom depiction of the handle in FIG. 12 and which is necessary to facilitate seating and clearance of the trigger stem portion 52 and the associated displacing cable. As best shown in the variant depicted in FIG. 12, the trigger component 58 further includes a pair of inner ledge supports 60 (see again FIG. 12) which seat against undersides of the upper disc portion 55 associated with the stem. Upon upwardly pivoting the handle 54, the underside seating engagement created between the inner recessed surface of the lift handle and upper seating portion of the trigger component causes the trigger to rotate in unison and the associated stem (via upper disc 55) and trigger support 40 to upwardly displace, with resultant upward displacement and tensioning of the coil spring 32 resulting in the hook 18 eventually rotating to the release position.

Figure 6:
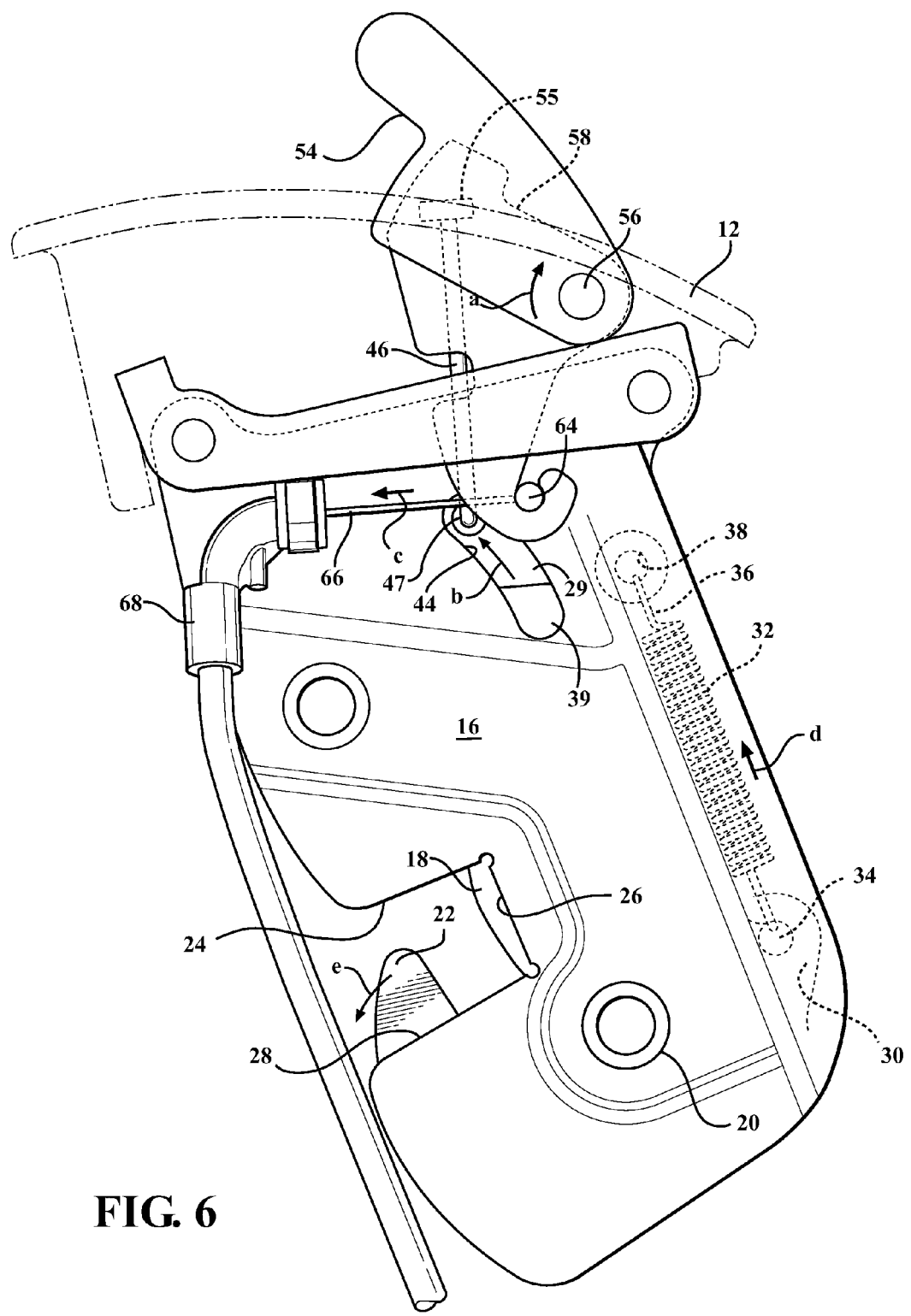
FIG. 6 is an illustration immediately following FIG. 5 and depicting a condition in which initial hook rotation is initiated.

Additional structure for permitting independent actuation of the striker engaging hook 18, without pivoting of the release handle 54, further contemplates the spaced apart body portions defining the trigger component 58 exhibiting a downward/angled configuration and terminating at a lower-most location 62 (see as best shown in FIG. 2) which seats an extending end 64 of a displacing cable 66 (best shown in FIGS. 5 and 6). A fitting 68 defines an initial part of an elongate extending and fixed outer sheath 69, the fitting 68 being mounted at a location of the latch for receiving the inner displacing cable 66 and which is capable of being separately and remotely actuated by remote located handle 9 (again FIG. 1) to which an opposite end of extending body 69 of the cable extends, inward displacement of the cable 66 causes the trigger component 58 to rotate in the same manner as previously described, without requiring concurrent pivoting of the lift handle 54 and again due to the clearance established within the recessed interior of the lift handle which allows the upper portion of the trigger to rotate outwardly in non-contacting fashion.

Other features include a base support 70 for seating the lift handle 54 in a pre-rotated position and, by extension, the trigger component 58. The base support 70 is secured to upper ends of the spaced apart plates 14 and 16 in a manner further illustrated in the end profile in FIG. 5, such as which enables the latch assembly to be secured to an upper pivoting frame sector associated with an outboard side of a rear row pivoting seatback.

A protocol for actuating the release of striker engaging portion 22 of the rotating hook 18 includes, in a first operational scheme, upward rotation of the lift handle 54 (directional arrow "a" as initially depicted in FIG. 5) and which in turn upwardly displaces the slaved trigger 58 and the seatingly supported upper disk end 55 of the interconnecting and slaved stem, this in turn upwardly pivoting the first 29 and second 39 cams along arcuate channels 42 and 44 (directional arrow "b"). Along with pivoting of the second slaved cam 39 in a direction against the bias exerted by the second spring 49, upward displacement of the first cam 29 tensions the first coil spring 32 (along directional arrow "d") and such that, upon a sufficient tension induced rotating force being delivered to lower ring aperture 30 of the hook 18, the hook is induced to rotated (directional arrow "e") in an unseating direction relative to the striker supported location associated with the rear supporting package shelf.

A corresponding actuating protocol for independently actuating the hook 18, via cable 66, includes inward cable displacement (directional arrow "c") of the cable 66 within the outer fixed sheath 68 (this occurring during either slaved upward pivoting of the inner trigger 58 or the remote actuation of the trunk located latch 9). At this point, the trigger 58 is simultaneously caused to rotate in previously identified directional arrow "a" about pivot point 56, by virtue of the engaging end 64 of the cable 66 exerting a rotating force on the engaged and lower extending end location 62 of the trigger 58. It should be noted that the cable 66 likewise inwardly displaces within the fixed sheath 68 in response to upward rotation of the lift handle 54 according to the first operation protocol, however in that instance such inward displacement results as an incident to the primary actuating force (lift handle 54) and not itself as the primary actuating force as is the case in the second operational protocol.

Figure 7:
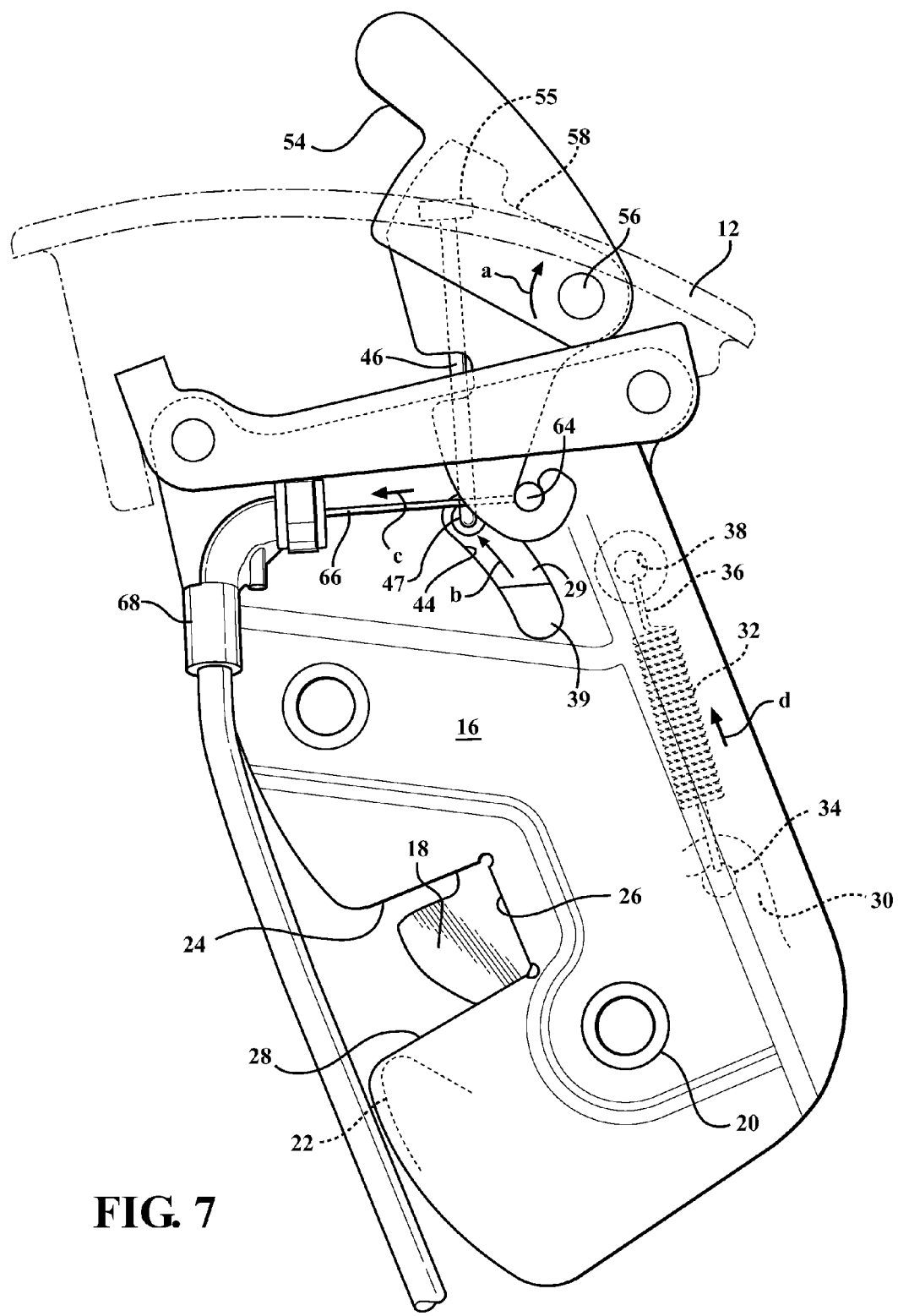
FIG. 7 is a further succeeding illustration depicting spring retracting rotation of the hook to the striker disengaging position.

Upward rotation of the trigger 58 in this instance occurs without concurrent upward pivoting of the lift handle 54 due to the seating support established between the trigger 58 and supporting interior surface of the handle which provides for unconstrained upward movement of the trigger). The upwardly displacing motion exerted on the interconnecting stem (via its upper disk end 55 seated upon pivoting ledge supports 60 of the trigger 58) again causes the first 29 and second 39 cams to again displace along channels 42 and 44 and the biased pin 47, thereby upwardly tensioning along directional arrow "d" to in turn rotate hook 18 along directional arrow "e". This is best depicted in the succession of views FIG. 6 (hook 18 starting to rotated as compared to initial lift handle 54 actuation in FIG. 5) and succeeding FIG. 7 (hook 18 rotated open and spring 32 displaced and partially retracted).

Figure 8:
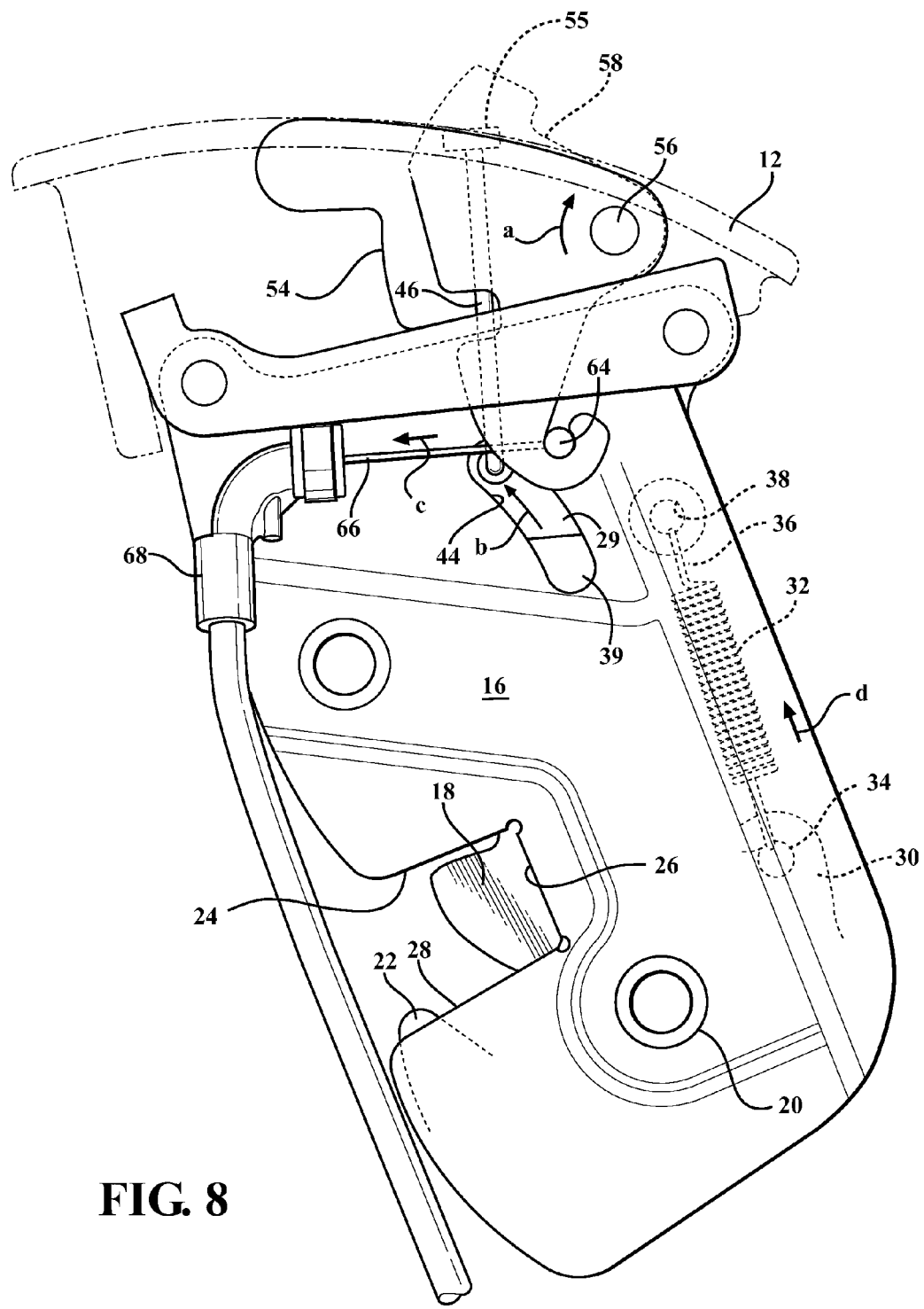
FIG. 8 succeeds FIG. 7 and depicts the outer lift handle reverse rotated to the retracted/flush position relative to the outer surface reveal of the seatback while leaving the cable actuating inner trigger component, slaved only in upwardly pivoting fashion, independently retained in its upper pivotal position.
Figure 9:
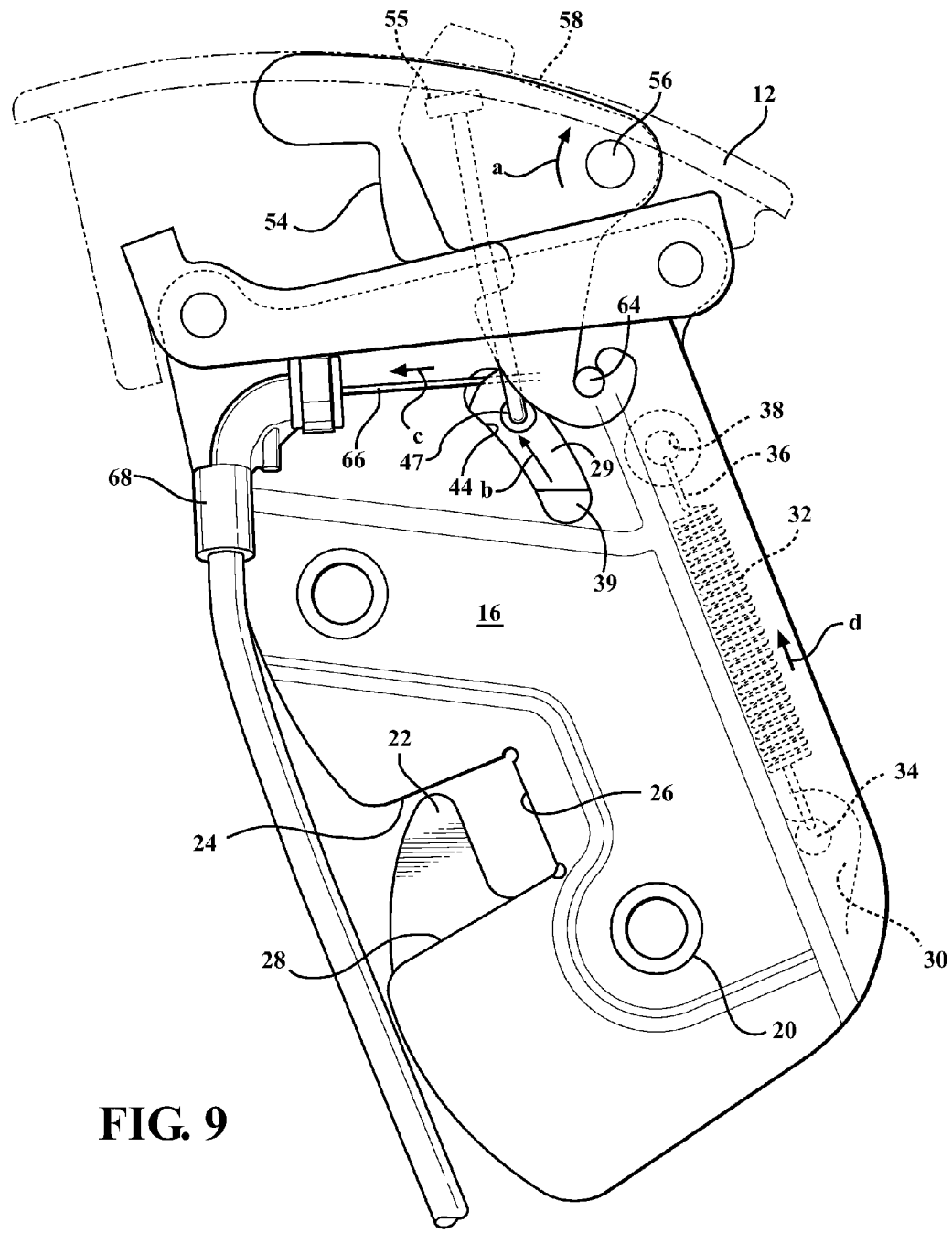
FIG. 9 is an illustration directly succeeding FIG. 8 and depicting the inner trigger component in subsequent and independent retracting motion in order to reseat within the inner recess configuration of the outer lift handle, again as a result of reverse/downward pulling of the slaved trigger support and trigger displaceable stem in order to cause the inner trigger component to reseat in the original position depicted in FIGS. 1, 2 and 4.
Figure 10:
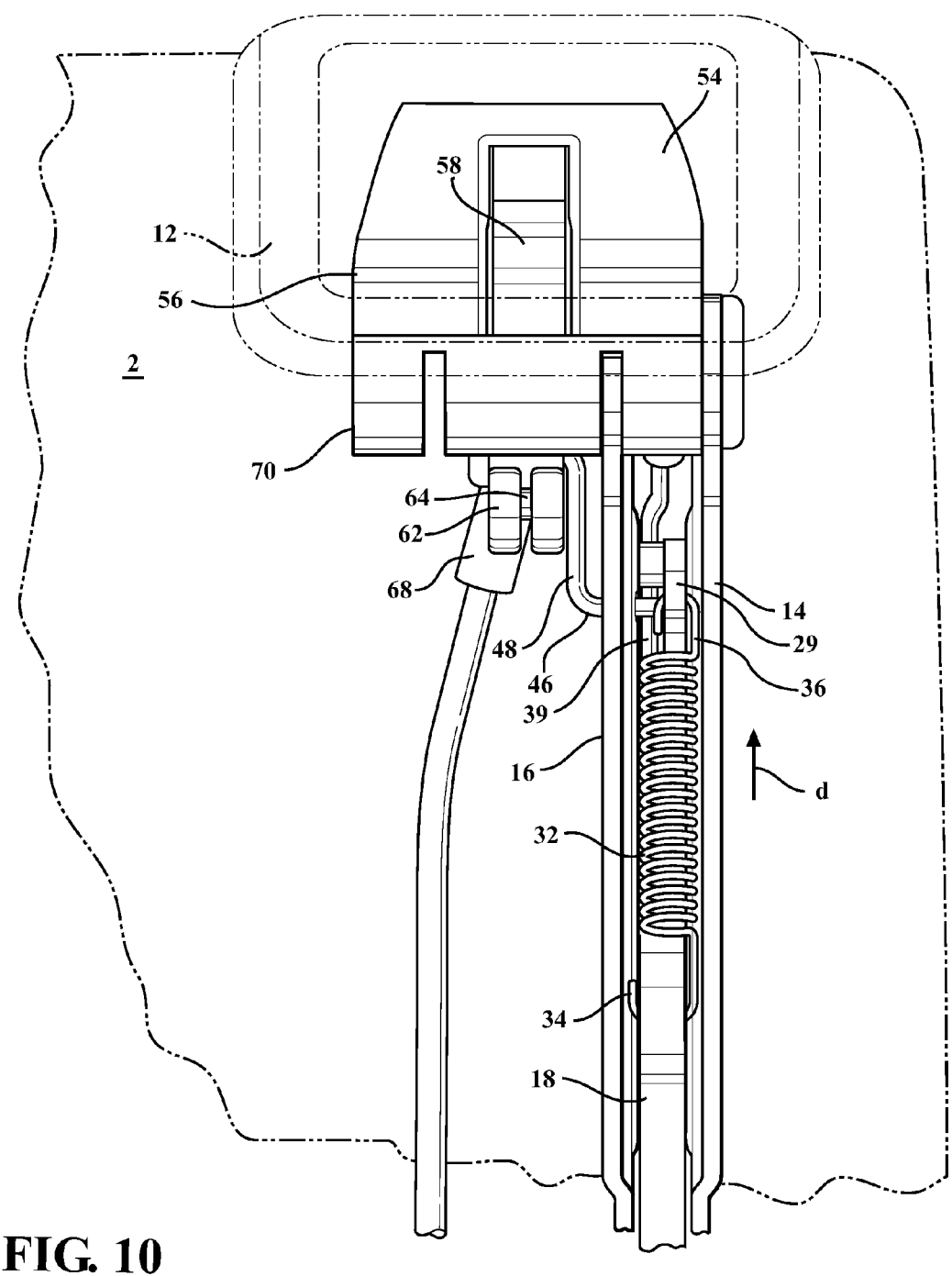
FIG. 10 is a further rotated front view of the latch in FIG. 4 and illustrating the manner in which it is mounted within an overall seatback.
Figure 11:
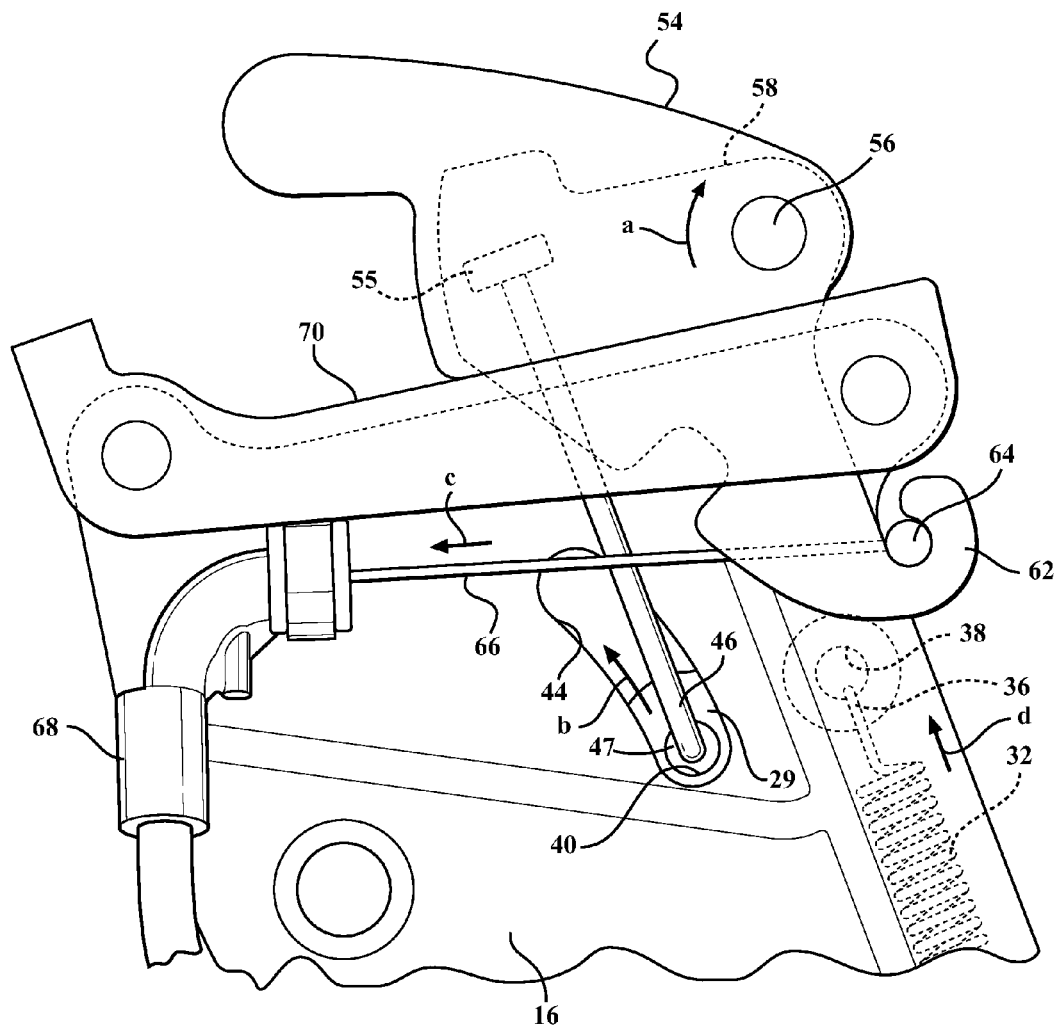
FIG. 11 is an enlarged upper sectional view of the latch in FIG. 4, with upper reveal removed, and better showing the interface of the linkages interconnecting the lift handle with the spring triggering mechanism for rotating the hook, as well as the independent actuating linkage triggered by the cable.

Reverse reseating motion of the hook 18, according to either protocol, occurs upon the trigger 58 being relaxed (FIGS. 8-9), such as during reverse upward rotation of the seat back 4, with the result being the spring 32 causes the hook 18 to reseat into engagement with the package shelf 6 supported striker 8.

Having described my invention, other and additional preferred embodiments will become apparent to those skilled in the art to which it pertains, and without deviating from the scope of the appended claims.

We claim:

1. A high handle seat latch incorporated into a rotating seatback, comprising:
    a body integrated into the seatback and exhibiting a rear facing hook engaging a package shelf supported striker in an upright design position;
    said body further comprising a pair of spaced apart plates defining an interior package space within which is pivotally supported by said hook pivotally slaved at a pivot point defined by a centrally located rivet extending between said plates;
    a lift handle supported at an upper end of said body and accessible from a top of the seatback;
    a linkage interconnecting said handle with said hook and responsive to upward rotation of said handle to rotate said hook to a striker release and forward dump position; and
    a cable actuating said linkage independent of said lift handle to actuate said hook to said release position.

2. The invention as described in claim 1, further comprising a striker engaging portion of said hook projecting into edge configured and interiorly recessed window portions established in said plates for seating the striker in the upright design position.

3. The invention as described in claim 2, further comprising an apertured end location of said hook opposite said striker engaging portion, a coil spring located along a rear edge of the package defined space and including a first end engaging said apertured location, a second end of said spring engaging a first cam which restrains movement of said hook in the upright design position, a widthwise extending pin extending from said first cam and seating within an elongated and arcuate channel opening defined in at least on support plate.

4. The invention as described in claim 3, further comprising a trigger displacing stem exhibiting an elongated and stepped configuration, with a lower-most end engaging said first cam, an upper enlarged disc being supported atop an end of an opposite and uppermost portion of said stem.

5. The invention as described in claim 4, further comprising a generally hook shaped trigger supported at an upper end of said body in coaxial fashion with said lift handle, a first end of said trigger seated upon said lift handle and slaved thereto in order to actuate said linkage, said cable engaging a second opposite end of said trigger.

6. The invention as described in claim 5, said body further comprising a window interior defined by an upper reveal within which is pivotally supported said handle and trigger, said handle defining an inner space seating an uppermost portion of said trigger along said coaxial pivot point.

7. The invention as described in claim 3, further comprising a second spring biased cam pivotally slaved with said first cam, each of said first and second cams exhibiting an edge profile opposing a supporting surface location of said hook in said striker engaging position.

8. The invention as described in claim 7, said first cam further comprising a structural cam with an edge profile an incrementally spaced distance relative to an opposing surface profile of said hook, said second cam further comprising an anti chuck cam arranged in stacked and common pivoting fashion with said first cam, said second cam exhibiting a dimensionally larger edge profile in contact with said hook surface in said design position.

9. A seat latch incorporated into an elevated location of a rotating seatback proximate a vehicle interior supported striker, said latch comprising:
    a body integrated into the seatback and exhibiting a pair of spaced apart plates defining an interior package space within which is pivotally supported a hook exhibiting a rear facing configuration adapted for engaging a package shelf supported striker in an upright design position;
    a lift handle supported at an upper end of said body and accessible from a top of the seatback;
    a linkage interconnecting said handle with said hook and responsive to upward rotation of said handle to rotate said hook to a striker release and forward dump position; and
    a cable actuating said linkage independently of said lift handle to actuate said hook to said release position, said cable extending from a second handle at a remote location relative to said body.

10. The invention as described in claim 9, further comprising a striker engaging portion of said hook projecting into edge configured and interiorly recessed window portions established in said plates for seating the striker in the upright design position.

11. The invention as described in claim 10, further comprising an apertured end location of said hook opposite said striker engaging portion, a coil spring located along a rear edge of the package defined space and including a first end engaging said apertured location, a second end of said spring engaging a first cam which restrains movement of said hook in the upright design position, a widthwise extending pin extending from said first cam and seating within an elongated and arcuate channel opening defined in at least one of said plates.

12. The invention as described in claim 11, further comprising a trigger displacing stem exhibiting an elongated and stepped configuration, with a lower-most end engaging a location of said first cam, an upper enlarged disc being supported atop an end of an opposite and uppermost portion of said stem.

13. The invention as described in claim 12, further comprising a generally hook shaped trigger supported at an upper end of said body in coaxial fashion with said lift handle, a first end of said trigger seated upon said lift handle and slaved thereto in order to actuate said linkage, said cable engaging a second opposite end of said trigger.

14. The invention as described in claim 13, said body further comprising a window interior defined by an upper reveal within which is pivotally supported said handle and trigger, said handle defining a generally "U" shape in configuration with an inner space seating an uppermost portion of said trigger along said coaxial pivot point.

15. The invention as described in claim 11, further comprising a second spring biased cam pivotally slaved with said first cam, each of said first and second cams exhibiting an aligning and restraining profile for engaging an abutting location of said hook in said striker engaging position.

16. A seat latch incorporated into an elevated location of a rotating seatback proximate a vehicle interior supported striker, said latch comprising:

a body integrated into the seatback and exhibiting a surface reveal frame, to an underside of which is secured a pair of downwardly projecting and spaced apart plates defining an interior package space;

a hook pivotally supported at a first location between said plates and including a striker engaging portion which projects from a recess profile associated with aligning edge locations of said plates and which is adapted for engaging a package shelf supported striker in an upright design position;

a lift handle supported at an upper end of said body and which is accessible from said surface reveal mounted upon an exposed top of the seatback;

a linkage interconnecting said handle with said hook and responsive to upward rotation of said handle to rotate said hook to a striker release and forward dump position, said linkage including a coil spring located along a rear edge of the package defined space and including a first end engaging said hook end location, a second end of said spring engaging a first structural cam having a widthwise extending pin located in alignment and seating with a generally elongated and arcuate channel opening defined in at least one of said aligning support plates, an edge profile of said first cam exhibiting a spaced tolerance relative to an opposing support edge associated with said hook in the upright design and striker engaging position;

said linkage further comprising a trigger displacing stem exhibiting an elongated and stepped configuration, with a lower-most end engaging a location of said first cam, an upper enlarged disc being supported atop an end of an opposite and uppermost portion of said stem; and a cable actuating said linkage independent of said lift handle to actuate said hook to said release position.

17. The invention as described in claim 16, further comprising a generally hook shaped trigger supported at an upper end of said body in coaxial fashion with said lift handle, a first end of said trigger seated upon said lift handle and slaved thereto in order to actuate said linkage, said cable engaging a second opposite end of said trigger.

18. The invention as described in claim 16, said body further comprising a window interior defined by an upper reveal within which is pivotally supported said handle and trigger, said handle defining a generally "U" shape in configuration with an inner space seating an uppermost portion of said trigger along said coaxial pivot point.

19. The invention as described in claim 16, further comprising a second spring biased anti-chuck cam pivotally slaved with said first structural cam, a corresponding edge profile of said second cam being dimensionally larger than said first cam and engaging said support edge of said hook in the upright design and striker engaging position.

20. A seat latch incorporated into an elevated location of a rotating seatback proximate a vehicle interior supported striker, said latch comprising:

a body integrated into the seatback and exhibiting a pair of spaced apart plates defining an interior package space within which is pivotally supported a hook exhibiting a rear facing configuration adapted for engaging a package shelf supported striker in an upright design position;

a striker engaging portion of said hook projecting into edge configured and interiorly recessed window portions established in said plates for seating the striker in the upright design position;

an apertured end location of said hook opposite said striker engaging portion, a coil spring located along a rear edge of the package defined space and including a first end engaging said apertured location, a second end of said spring engaging a first cam which restrains movement of said hook in the upright design position, a widthwise extending pin extending from said first cam and seating within an elongated and arcuate channel opening defined in at least one of said plates;

a trigger displacing stem exhibiting an elongated and stepped configuration, with a lower-most end engaging a location of said first cam, an upper enlarged disc being supported atop an end of an opposite and uppermost portion of said stem;

a lift handle supported at an upper end of said body and accessible from a top of the seatback; and a linkage interconnecting said handle with said hook and responsive to upward rotation of said handle to rotate said hook to a striker release and forward dump position.

* * * * *